Dec. 17, 1968       G. E. LONG ET AL       3,416,416
CONTROL SYSTEM FOR FLEXIBLE AND SECTIONALIZED SCREEDS
Filed Dec. 23, 1966                      3 Sheets-Sheet 1
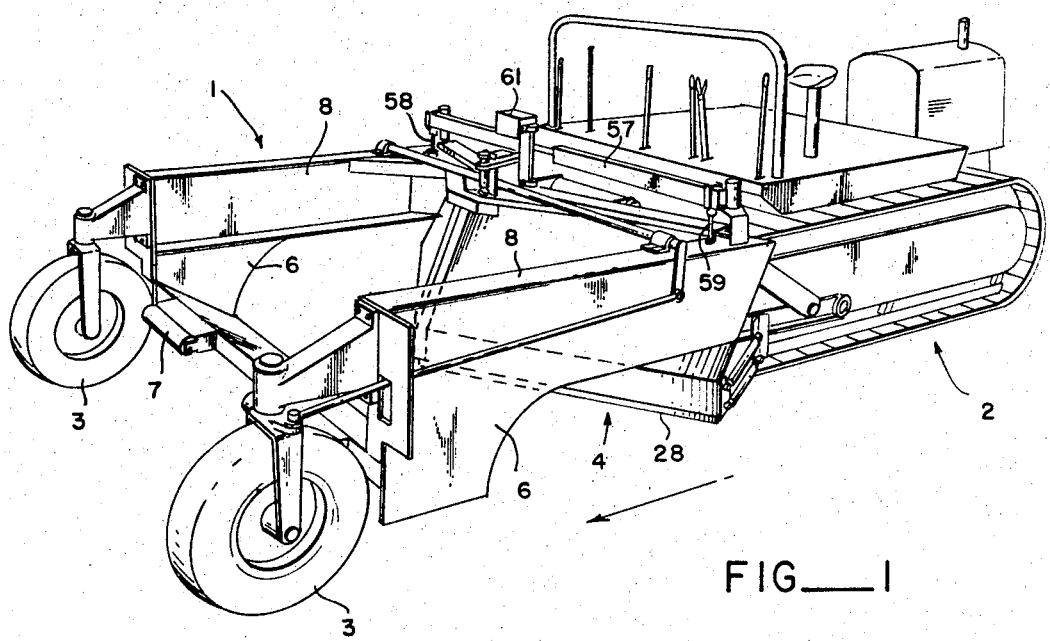
FIG__1
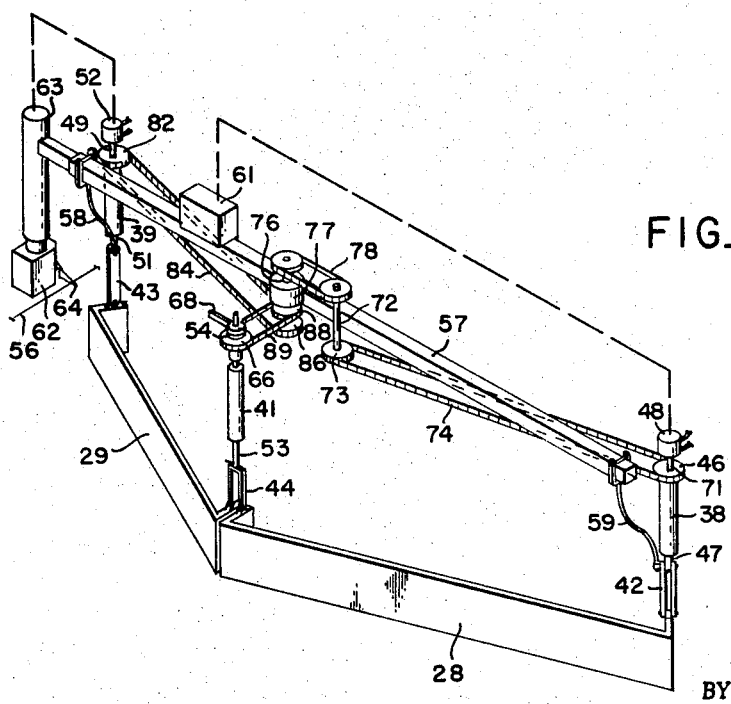
FIG__2
GEORGE E. LONG
HOWARD G. ANSON
INVENTORS.
BY
ATTORNEYS

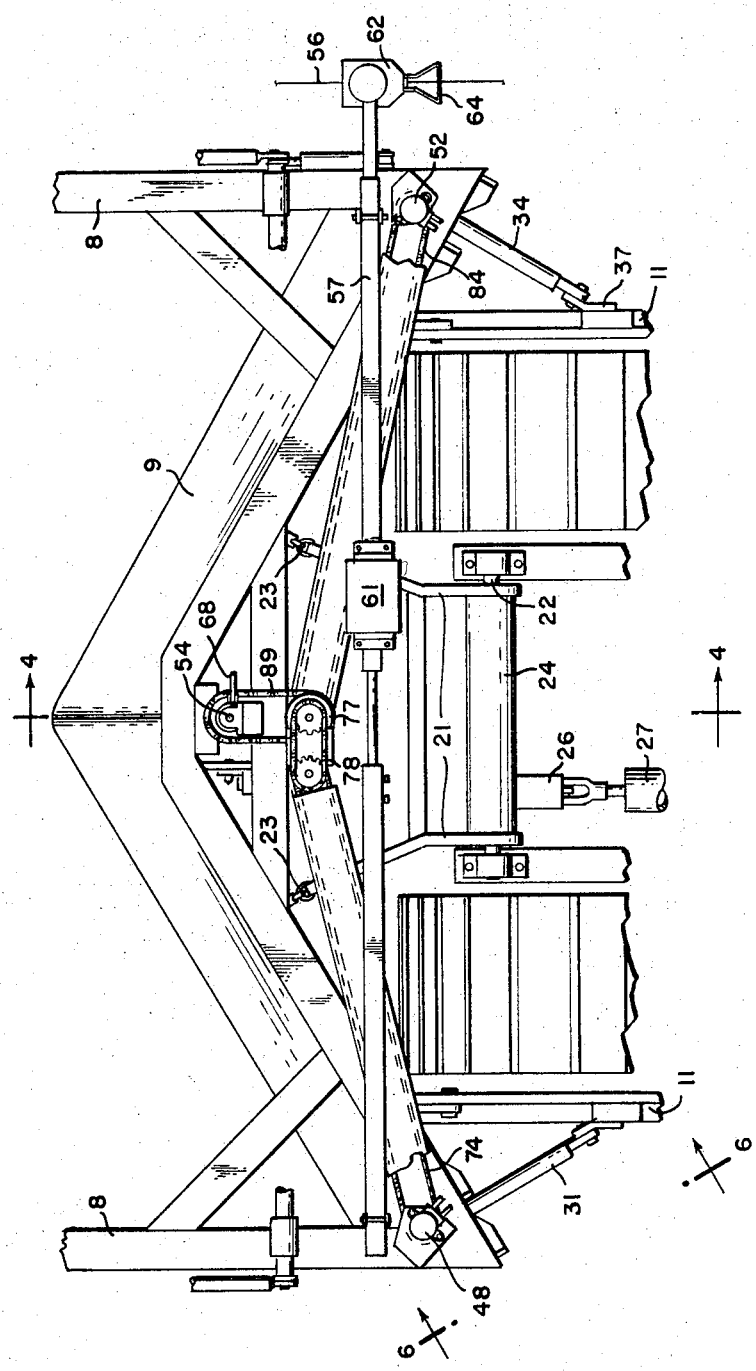
FIG.—3
GEORGE E. LONG
HOWARD G. ANSON
INVENTORS.
BY
ATTORNEYS

Dec. 17, 1968    G. E. LONG ET AL    3,416,416
CONTROL SYSTEM FOR FLEXIBLE AND SECTIONALIZED SCREEDS
Filed Dec. 23, 1966    3 Sheets-Sheet 3
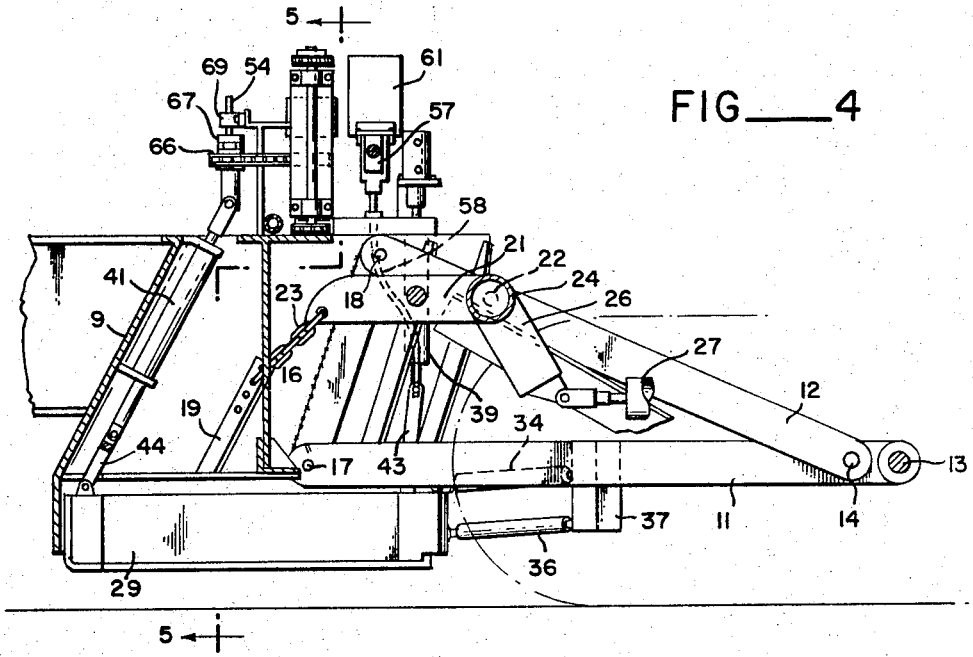
FIG__4
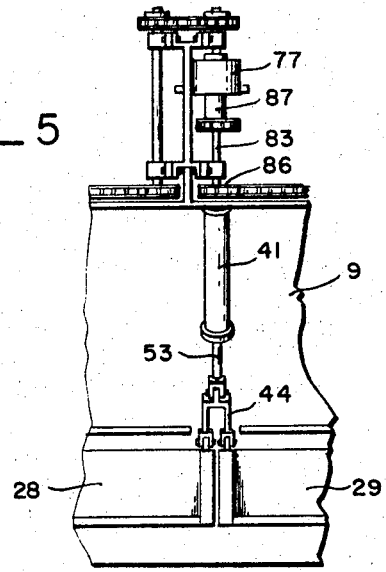
FIG__5
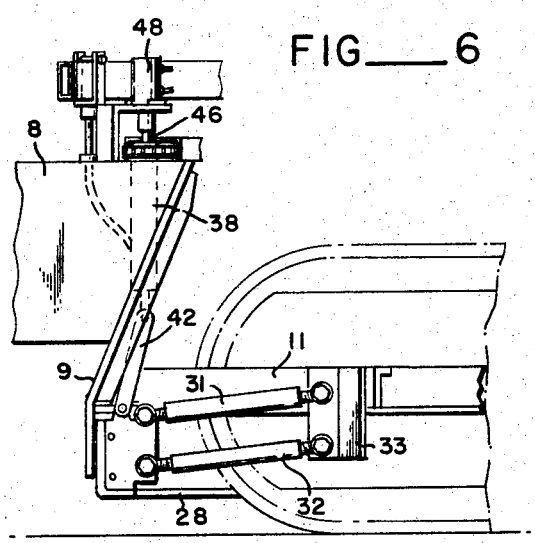
FIG__6
GEORGE E. LONG
HOWARD G. ANSON
    INVENTOR.
BY *Seed & Berry*
ATTORNEYS United States Patent Office 3,416,416
Patented Dec. 17, 1968

3,416,416
CONTROL SYSTEM FOR FLEXIBLE AND SECTIONALIZED SCREEDS
George E. Long, Rte. 2, Box 382, Monroe, Wash. 98272, and Howard G. Anson, 15823 35th NE., Seattle, Wash. 98105
Filed Dec. 23, 1966, Ser. No. 605,151
8 Claims. (Cl. 94—46)

ABSTRACT OF THE DISCLOSURE

A control system for a moving screed of the flexible or multiple sectioned type having separate vertical adjustment means on the end points and intermediate of the end points for forming a "crown" on the material being spread. The intermediate control point or points are raised and lowered simultaneously with adjustment of either or both of the end points by means of a differential drive unit driven by the screed end adjusting means. The adjustment of the intermediate portion of the screed through differential drive means serves to maintain a preset crown relation on the screed as the outer end points are adjusted from time to time during its course of travel.

---

As used throughout this specification and appended claims, the term "crown" is defined as the relationship wherein an intermediate point or points on the screed are offset, either above or below, a line passing through the outer end points of the screed. A "positive crown" designates an offset above the line through the screed end points and a "negative crown" designates an offset below this line.

In the prior art, flexible and sectionalized screeds with multiple points of control are commonly used to spread aggregate for road building and other purposes and are carried or towed by such means as a tractor or other vehicle. The aggregate or other material to be spread is deposited in front of the moving screed which spreads the material at the proper elevation, transverse slope and crown, either positive or negative. With multiple control points for the screed, means are usually provided for independently raising and lowering the opposite outer ends of the screed as well as the midpoint or intermediate points of the screed which effects the crown. In the prior art, these adjustments are done manually such as by means of a crank or a wheel. Each time the outer edges of the screed, either one or both, are raised or lowered, the initial crown setting of the intermediate point or points must be adjusted accordingly in order to maintain the original crown setting. This type of control is of course very cumbersome and the degree of accuracy depends entirely upon the experience of the operator. In most instances, the resulting grade, slope and crown produced is at best only a rough approximation of that desired. For certain types of paving, this type of control is inadequate and unsatisfactory.

According to the present invention a system is provided for sensing a preset grade datum and controlling the power means for raising or lowering one side of the screed according to a grade signal. Transverse slope control is accomplished by sensing the transverse slope between the outer ends of the screed sections and controlling the other end of the screed. The transverse slope is thus kept at the desired value or increased or decreased at a predetermined rate. Sensing and control systems for providing grade and slope control are generally known in the prior art as exemplified by Patent No. 3,210,710. In addition to this control, the present system provides means to maintain a constant crown value by automatic adjustment of the midpoint or intermediate points on the screed even though the grade and/or the transverse slope of the screed is changed. This is accomplished by means of controlling the raising and lowering of the intermediate point or points through a differential drive unit or units from the individual power units connected to the outer ends of the screed.

Accordingly, the primary object of the present invention is to provide a control system for accurately controlling the grade and transverse slope of a screed while automatically maintaining a preset crown relationship.

Another and more specific object of the present invention is to provide a control system of the character described wherein a screed is controlled for slope and grade by separate adjustment of the opposite ends of the screed and whereby a preset crown relation is maintained by means of vertical adjustment of the intermediate portion of the screed through differential drive means from the end adjusting means.

These and other objects will be apparent to those skilled in the art from the following specifications and claims and from the accompanying drawings wherein:

DESCRIPTION OF DRAWINGS

FIG. 1 is a perspective view of a two piece screed carried on a crawler type tractor;

FIG. 2 is a partially schematic elevational detail of the two piece screed and the drive arrangement for adjusting the three points of suspension;

FIG. 3 is a plan view of the screed apparatus;

FIG. 4 is a cross sectional view taken along lines 4—4 of FIG. 3;

FIG. 5 is an elevational detail taken along lines 5—5 of FIG. 4; and

FIG. 6 is an elevational detail taken along lines 6—6 of FIG. 3.

DESCRIPTION OF INVENTION

Referring now to the drawings wherein like reference numerals indicate identical parts of the various views, FIG. 1 illustrates an embodiment of the invention wherein the overall spreader apparatus, indicated generally at 1, is mounted for support and travel on the front end of a conventional crawler type tractor 2 with the spreader being additionally supported by the steerable ground wheels 3 carried on the front end of its support frame. As is conventional in the art, the spreader apparatus is utilized by following behind a dump truck which deposits the aggregate or other material to be spread directly in front of the screed assembly, indicated generally at 4, and between the skirts 6. The screed assembly 4 is moved forwardly in the direction of the arrow indicated in FIG. 1 by the tractor 2 and serves to spread a quantity of aggregate or other material deposited between the skirts 6. Although the present embodiment depicts a two-piece three-point controlled screed, such is by way of illustration and not limitation since the broad aspects of the invention relate equally to one-piece flexible screeds that are bowed in the mid portion at a control point or points to produce a crown and to screeds having more than two sections.

In the present embodiment, the screed assembly 4 is rigidly carried between the beams 8 and is supported by the tractor through the linkage shown most clearly in FIGS. 3 and 4. As will be explained, the screed assembly and the rear end of the spreader frame are vertically adjustably mounted on the front end of the tractor and the screed is mounted for vertical adjustment relative to the screed assembly and the frame. The screed assembly 4 includes the V-shaped hood 9 which extends between the beams 8 and may be welded or otherwise rigidly fixed thereto. The hood 9 and beams 8 may be provided with any desired type of bracing or structural reinforcement, the details of which form no part of the present invention. Mounted on each side of the forward end of the tractor 2 is a pair of carrier arms 11 and 12, one set of which is shown in FIG. 4. The lower arms 11 are pivoted as at 13 to the tractor frame and the upper inclined arm 12 is pinned at 14 to the arm 11. The front ends of the arms 11 and 12 are pinned to a vertical bracket or plate 16 by bolts or pins 17 and 18. The plate 16 may be welded or otherwise fixedly attached to the backside of the hood 9 as indicated in FIG. 4. Also, fixedly attached to the backside of the hood 9 are laterally spaced angle brackets 19 as shown in FIG. 4. In order to provide means for pick-up and travel, spaced lift arms 21 are mounted on the pivot axis 22 on the tractor and are connected by means of chains 23 to the respective brackets 19. The arms 21 are interconnected by the hollow shaft 24 provided with a crank arm 26 which is operated by a hydraulic cylinder or the like 27 on the tractor. Through control of the cylinder 27, the screed assembly may be raised and lowered about the pivot point provided by the axis 13.

The screed member comprises the two screed sections 28 and 29. The outer end of the screed section 28 is connected to the carrier arm 11 on the one side of the tractor by means of the adjustable parallel links 31 and 32 each of which is pivotally connected to the end of the screed, and also to a bracket 33 carried by the arm 11. The other screed section 29 is similarily connected to the carrier arm 11 on the opposite side of the tractor as shown in FIGS. 3 and 4 by means of parallel links 34 and 36, each of which is pivotally connected to the end of the screed and to a bracket 37 on the carrier arm. Vertical support for the outer end of the screed section 28 is provided by means of a first jackscrew unit 38 affixed to one side of the hood 9 as illustrated in FIG. 6. The outer end of the screed section 29 is supported by the jackscrew unit 39 affixed to the opposite end of the hood 9 and the inner ends of the screed sections are supported by a third jackscrew unit 41 carried by brackets or the like affixed to the center portion of the hood as illustrated in FIG. 4. The jackscrew units 38 and 39 are connected to the outer ends of the respective screeds by the pivoted connecting links 42 and 43 respectively. The jackscrew unit 41 is connected to the inner ends of both of the screed sections by means of a clevis 44. The jackscrew units 38, 39 and 41 are conventional devices well known to the art having an input rotary shaft and an extensible and retractable plunger or rod operated by rotation of the input shaft. Thus, by rotation of the input shaft 46 of the unit 38, the plunger 47 is raised and lowered. In the present embodiment, the input shaft 46 is operated in either direction by means of a rotary hydraulic motor or the like 48. In like manner, the input shaft 49 operates the plunger 51 of the unit 39 and is driven by means of a second hydraulic motor 52. The plunger 53 of the unit 41 is operated by means of the input shaft 54 which is chain driven as will presently be described. Although the present embodiment is illustrated as employing jackscrew units driven by rotary hydraulic motors, it will be well understood by those skilled in the art that equivalent means such as a hydraulic piston and cylinder arrangement with appropriate valving could be used or the hydraulic motor could be replaced by such means as reversible electric motors for accomplishing the same purpose. The essential feature is to have the outer ends of the screed sections adjustable vertically by a controllable power means. It is also conceivable that the jackscrew 41 could be replaced by an equivalent means for raising and lowering the inner ends of the screed simultaneously.

As previously mentioned, one side of the screed will be controlled by a grade sensing and control device which senses a preset grade datum such as a taut wire 56 with the signal from the sensor being used to control one of the motors 52, as illustrated in FIG. 2. Such grade sensing and control devices are well known in the art, there being many types and designs. The present invention is not concerned with the details of such a system which could be of any design available in the prior art. The other motor 48 for the other end of the screed will be controlled by a slope sensing and control device independently of the control of the motor 52. Slope sensing and the control devices are likewise well known to the prior art and the details of such a system form no part of the present invention. Any such slope control system of suitable design may be used. Although the present invention is illustrated with the grade control being applied to the motor 52 and the slope control being applied to motor 48, it will be understood by those skilled in the art that the order could be reversed if desired or the slope and grade could both be taken from a fixed reference datum.

In the present embodiment, the slope sensing apparatus is carried on a sensor beam 57 which extends transversely of the frame members 8 and is vertically supported at both ends by the rods 58 and 59 which pass through suitable guide openings in the members 8 and are attached to the upper pivot points of the links 43 and 42 respectively as shown most clearly in FIG. 2. Regardless of how the beam is supported, the essential feature is that of relating the beam to the screed so as to reflect the transverse slope. Thus, the beam at all times reflects the transverse slope between the outer ends of each of the screed sections 28 and 29. The slope sensing unit 61 may be mounted at a convenient location along the beam 57 and functions to control the motor 48 to adjust the elevation of the outer end of the screed section 28 to maintain a predetermined slope quantity between the outer ends of the screed sections.

A grade control unit 62 is carried on a depending post 63 carried by the outer end of the beam 57 and includes a sensor element 64 which contacts the taut wire or other reference datum 56. The control unit 62 as previously mentioned, controls the motor 52 to maintain the outer end of the screed 29 at the proper grade obtained from the datum wire 56.

As previously mentioned, the inner ends of the screed sections in the present structure are raised and lowered simultaneously and automatically to maintain a preset crown relationship when the outer end of either or both of the screed sections are raised or lowered. For this purpose, the input shaft 54 for the jackscrew unit 41 is provided with a chain sprocket 66 which may be engaged to drive the input shaft or disengaged by means of a clutch unit 67 hand-operated by the arm 68 in a well-known manner. See FIGS. 3 and 4. The upper end of the input shaft 54 may be journalled in the block 69 carried on the machine frame. With this arrangements, the sprocket may be disengaged from the input shaft and the shaft rotated with a hand crank or other suitable means so as to initially set the desired crown or difference in elevation between the inner ends of the screed sections and the outer ends thereof. It will be realized, of course, that additional control points would be used if more than two screed sections were utilized. During operation, the clutch will, of course, be engaged so that the jackscrew unit is being driven through the sprocket 66.

The shaft 46 of the jackscrew unit 38 is provided with a chain sprocket 71 for driving a jack shaft 72 through a second sprocket 73 by means of the chain 74. Rotation of the shaft 72 is transferred to one input shaft 76 of a conventional differential unit 7. The drive is transferred by means of the chain 78 or its equivalent trained about the sprockets on the shafts 72 and 76 respectively.

The input shaft 49 of the other jackscrew unit 39 is provided with a chain sprocket 82 for driving the other input shaft 83 of the differential through the chain 84 and the sprocket 86 carried on the differential input shaft. The output shaft 87 of the differential is provided with a sprocket 88 which drives the chain 89 trained about the sprocket 66 of the jackscrew 41. The output of the differential thus serves to raise or lower the centerpoint of the screed as a result of varying the elevation of either or both of the outer ends of the screed. Due to normal differential action, holding one or the other of the shafts 46 and 49 and driving the other will cause a two-to-one reduction at the differential output in the present embodiment. Thus, adjusting only one side of the screed will result in an adjustment of one half the magnitude at the center point so as to restore the original crown relationship. Driving both shafts 46 and 49 in the same direction will cause the centerpoint of the screed to move at a one-to-one ratio with the outside points thus maintaining the crown value. It will be realized, of course, that in the event that more than one differential drive unit is used, as for example with more than two screed sections, the drive reduction will be accordingly proportional in order to maintain the original crown relationship. The original crown setting for the screed is in this manner maintained constant during the adjustment of the outside points for both grade and slope. The initial crown setting is accomplished, of course, by uncoupling the differential output drive from the jackscrew unit 41 and using a hand crank or the like.

From the foregoing, it will be readily apparent to those skilled in the art that the present invention provides an improved control system for multiple point controlled screeds of the character described. It will be understood that the specific structure described may be subjected to numerous modifications and variations well within the purview of this invention. Applicant herein intends only to be limited to a liberal interpretation of the specification and appended claims.

We claim:
1. A control system for a screed having multiple points of vertical control along its length comprising in combination; first control means for establishing an initial crown relationship of the intermediate portion of the screed relative to its end points, means for independently adjusting the elevation of the outer ends of the screed, and differential drive means responsive to adjustment of either or both of the outer ends of the screed to proportionately adjust the elevation of the intermediate portion of the screed so as to maintain said initial crown relationship.

2. In combination with a movable screed adapted for independent vertical control at its outer end points and its midportion to effect a crown setting, a control system comprising; first and second control means for independently adjusting the elevation of the outer ends of the screed respectively, third control means for independently adjusting the elevation of the midportion of the screed, and differential drive means drivingly connected to the first and second control means and to said third control means for adjusting the elevation of the midportion of the screed simultaneously responsive to adjustment of either or both of the outer ends thereof, whereby a preset crown relationship is maintained.

3. The combination according to claim 2 wherein; said first control means is adapted to adjust the associated end of the screed according to a preset grade datum, and said second control means is adapted to adjust the other end of the screed according to a predetermined transverse slope value between the outer ends of the screed.

4. In a spreader device having a two piece generally transverse screed including first and second screed sections, first and second independently adjustable vertical support means for the outer ends of the respective screed sections, and third independently adjustable support means connected for simultaneously raising and lowering the inner ends of the screed sections to control the crown setting of the screed, a control system comprising; first and second motor means connected to adjust said first and second support means respectively, first and second control means for actuating said first and second motor means respectively, and differential drive means for adjusting said third support means responsive to adjustment of either or both said first and second support means, whereby said initial crown setting is maintained.

5. The combination according to claim 4 wherein; said first control means is adapted to control said first motor means to adjust the elevation of the outer end of the associated screed section according to a preset grade datum, and said second control means is adapted to control said second motor means to adjust the elevation of the outer end of the other screed section according to a predetermined transverse slope value between the outer ends of the screed sections.

6. The combination according to claim 5 including; a transverse slope sensor beam, establishing relationship means mounting said beam so as to reflect the transverse slope between the outer ends of the screed sections, said second control means including means to sense the slope of said beam for controlling the adjustment of the outer end of said other screed section.

7. The combination according to claim 6 wherein said motor means constitute rotary drive units, said differential drive means having input drive shafts connected to be driven by said motor means respectively and output drive slope means connected to actuate said third adjustable support means.

8. The combination according to claim 7 including clutch means to selectively disconnect the output drive shaft of said differential from said third adjustable support means for effecting an initial crown setting.

References Cited
UNITED STATES PATENTS

| | | | |
|---|---|---|---|
| 3,210,710 | 10/1965 | Amos | 94—46 XR |
| 2,999,433 | 9/1961 | Baltes | 94—45 |

JACOB L. NACKENOFF, *Primary Examiner.*